United States Patent
Mochizuki (12)

(10) Patent No.: US 6,401,651 B1
(45) Date of Patent: *Jun. 11, 2002

(54) AUTOMATIC SPRAY APPARATUS FOR OILY CONFECTIONERY RAW MATERIAL

(76) Inventor: Keizo Mochizuki, c/o Meiji Seika Kaisha, Ltd., 3-1, Chiyoda 5-chome, Sakado-shi, Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/504,935

(22) Filed: Feb. 16, 2000

Related U.S. Application Data

(63) Continuation of application No. 09/017,707, filed on Feb. 5, 1998, now Pat. No. 6,125,787.

(30) Foreign Application Priority Data

Feb. 5, 1997 (JP) ................................................ 9-22420

(51) Int. Cl.⁷ ................................................ B05C 5/00
(52) U.S. Cl. .................. 118/24; 118/302; 239/135; 239/407; 239/455; 239/456; 239/537; 239/541
(58) Field of Search ................... 118/24, 302, 712; 239/537, 541, 407, 135, 455, 456; 128/200.14, 200.18, 200.21; 222/518, 525, 146.5; 426/306; 99/534, 516; 431/186; 137/893; 123/531

(56) References Cited

U.S. PATENT DOCUMENTS

| | | | | |
|---|---|---|---|---|
| 3,174,689 A | * | 3/1965 | McIntyre | 239/541 |
| 3,185,129 A | * | 5/1965 | Sollich | 118/24 |
| 4,084,934 A | * | 4/1978 | Kumazawa | 56/14.6 |
| 4,265,248 A | * | 5/1981 | Chuiton et al. | 600/303 |
| 4,801,093 A | * | 1/1989 | Brunet et al. | 239/490 |
| 4,813,577 A | * | 3/1989 | Caron | 222/486 |
| 5,199,641 A | * | 4/1993 | Hohm et al. | 239/102.2 |
| 5,361,990 A | * | 11/1994 | Pimentel | 239/133 |
| 5,399,198 A | * | 3/1995 | Ghaisas | 118/629 |
| 5,725,154 A | * | 3/1998 | Jackson | 239/135 |
| 6,125,787 A | * | 10/2000 | Mochizuki | 118/24 |

FOREIGN PATENT DOCUMENTS

| | | | |
|---|---|---|---|
| DE | 1200663 | * | 9/1965 |
| DE | 1816945 | * | 6/1970 |
| DE | 3007990 | * | 9/1981 |
| DE | 3108793 | * | 9/1982 |
| DE | 4303113 | * | 8/1994 |
| EP | 0212442 | * | 3/1987 |
| EP | 0554707 | * | 8/1993 |
| GB | 1503682 | * | 3/1978 |
| GB | 2085321 | * | 4/1982 |
| GB | 2249740 | * | 5/1992 |

\* cited by examiner

*Primary Examiner*—Laura Edwards

(57) ABSTRACT

A spray apparatus for spraying oily confectionery raw material, wherein a nozzle cap is disposed around a nozzle, the nozzle cap is interlocked with a nozzle-cap-bar drive disc through a nozzle cap driving bar, the nozzle-cap-bar drive disc is coupled with a cap-bar drive motor so that the nozzle-cap-bar drive disc is lengthwise moved to a desired position. The spray apparatus can independently control a spraying area and a particle size of the sprayed oily confectionery material in simple and automatic manner when the oily confectionery raw material is sprayed.

7 Claims, 2 Drawing Sheets

US 6,401,651 B1

AUTOMATIC SPRAY APPARATUS FOR OILY CONFECTIONERY RAW MATERIAL

This is a continuation application of application Ser. No. 09/017,707 filed Feb. 5, 1998, now U.S. Pat. No. 6,125,787.

BACKGROUND OF THE INVENTION

1. Field of the Invention

The present invention relates to a spray apparatus, for spraying oily confectionery raw material, which (1) optionally controls the spray area while maintaining the size of sprayed particles, and (2) automatically controls the spraying area and the particle size of sprayed oily confectionery raw material. Thus, the spray apparatus applies a uniform coating of raw material, such as chocolate, white chocolate, and oily cream, onto the surface of food.

2. Description of the Related Art

Two methods for spraying oily confectionery raw material are known: (1) an air spraying method using the compressed air for spraying the oily confectionery raw material, and (2) an airless spraying method in which the oily confectionery raw material is sprayed through a nozzle by use of a pressure tank or a high pressure pump. In the air spraying method, the amount or the pressure of compressed air is varied in order to control the spraying area and the particle size of the sprayed particles. When the amount or the pressure of compressed air is varied, the spraying area and the particle size are both changed. Therefore, in this method, it is difficult to control the spraying area and the particle size independently. In the airless spraying method, the liquid pressure supplied to a nozzle is varied to control the spraying area. When the spraying area varies, however, so does the particle size. Therefore, in this method, it is difficult to control the spraying area and the particle size independently.

Although these conventional spraying techniques are generally thought to be acceptable, they are not without shortcomings. Namely, it remains difficult to control the spraying area and the particle size independently. In general, the particle size is reduced when the spraying area is increased. For many applications, however, it is desirable to vary the spraying area while maintaining the particle size.

In the airless spraying method, in order to control the spraying area and the size of sprayed particles, it is necessary to control the pump pressure of the high pressure pump, to select a nozzle chip, and to control the viscosity of the oily confectionery raw material. In the air spraying method, in order to control the spraying area and the size of the sprayed particles, it is necessary to control the air pressure, to control the viscosity of the raw material supplied to the nozzle, and to control the amount of supplied raw material. In both techniques, the adjustments are complex, that is, the control over the spraying area and the particle size is complex.

SUMMARY OF THE INVENTION

It is an object of the present invention to provide an improved spray apparatus that easily and automatically controls the spraying area and the size of the sprayed particles, more specifically, an automatic spray apparatus for oily confectionery raw material that optionally adjusts the spray area while maintaining the particle size.

The present invention provides a spray apparatus for spraying oily confectionery raw material, wherein a nozzle cap is disposed around a nozzle, the nozzle cap is interlocked with a nozzle-cap-bar drive disc through a nozzle cap driving bar, and the nozzle-cap-bar drive disc is coupled with a cap-bar drive motor so that the nozzle-cap-bar drive disc is lengthwise moved to a desired position.

DETAILED DESCRIPTION OF THE INVENTION

The present invention will be described with reference to the accompanying drawings.

Figure 1:
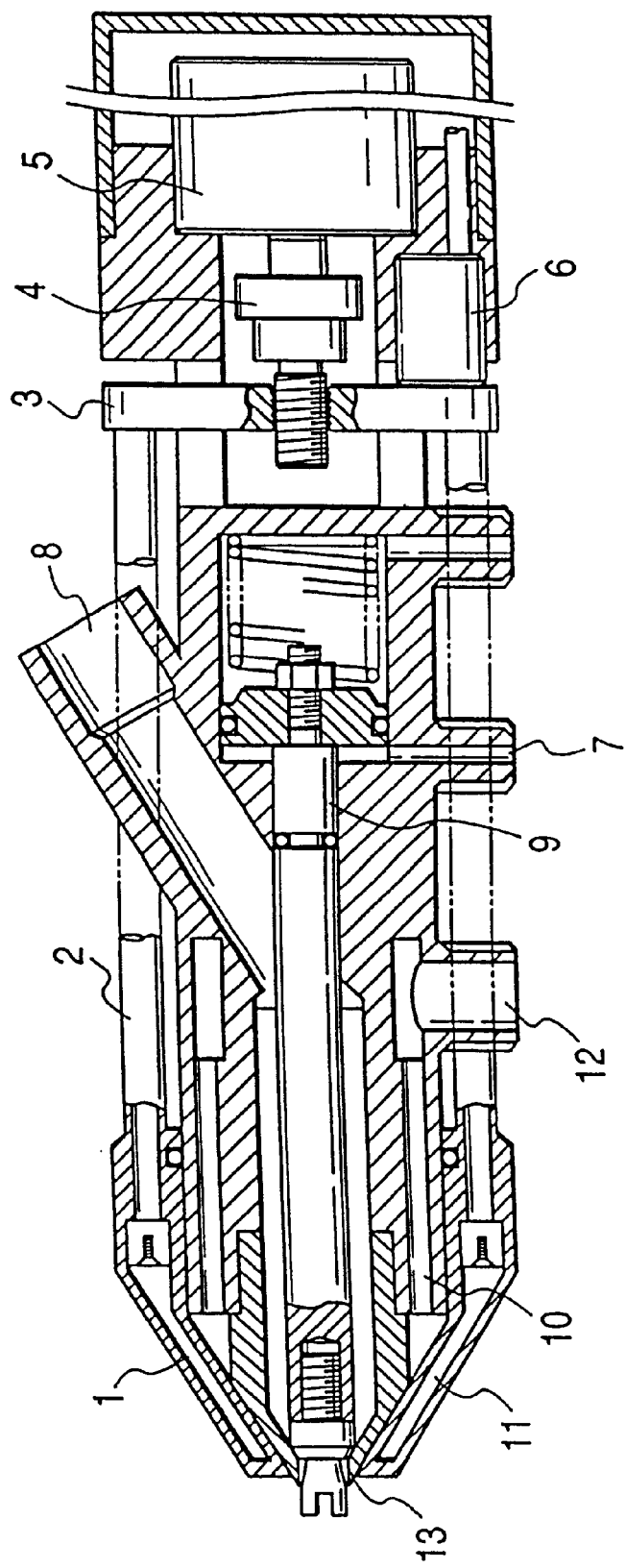
FIG. 1 is a sectional view of a spray apparatus according to an embodiment of the present invention, in which a nozzle cap is in a retracted position.
Figure 2:
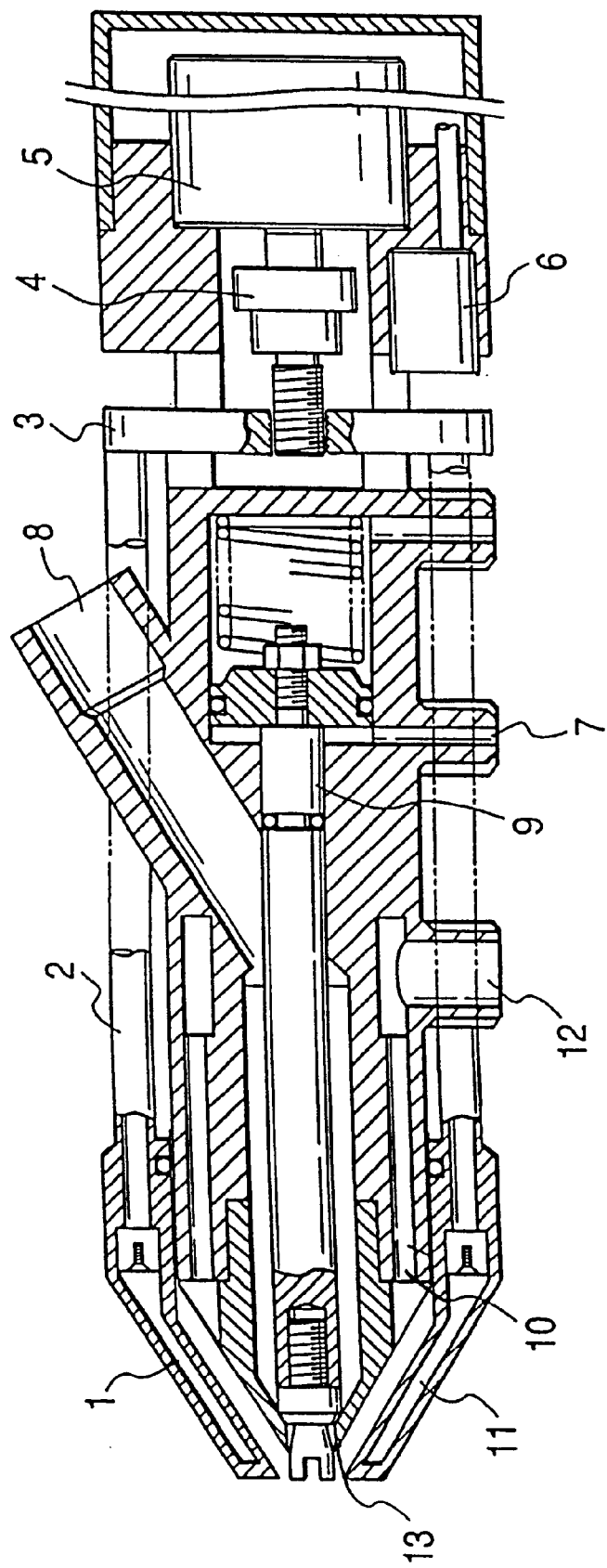
FIG. 2 is a sectional view of a spray apparatus according to an embodiment of the resent invention, in which the nozzle cap is in an extended position.

FIGS. 1 and 2 show a spray apparatus, for spraying oily confectionery raw material, which independently controls a spraying area and a size of the sprayed oily confectionery raw material particles in a simple and automatic manner. In FIGS. 1 and 2, reference numeral 1 represents a nozzle cap; 2 represents a nozzle cap driving bar; 3 represents a nozzle-cap-bar drive disc; 4 represents a slipping clutch with a screw; 5 represents a cap-bar drive motor; 6 represents a nozzle-cap drive control sensor; 7 represents a compressed air inlet for driving a needle valve; 8 represents an oily confectionery raw material inlet; 9 represents a needle; 10 represents a spray air outlet; 11 represents a cap heater; 12 represents a spray air inlet; and 13 represents a nozzle.

The nozzle cap 1 may be moved by the nozzle cap driving bar 2 in the lengthwise direction. The nozzle cap driving bar 2 is coupled to the nozzle-cap-bar drive disc 3. The nozzle-cap-bar drive disc 3 is a disc-like member having a threaded hole in the central part thereof. The slipping clutch 4 has a screw inserted into (and screw coupled to) the threaded hole of the nozzle-cap-bar drive disc 3. The slipping clutch 4 is also coupled to the cap-bar drive motor 5. A current position of the nozzle-cap-bar drive disc 3, which is movable, is detected by the nozzle-cap drive control sensor 6.

The spray apparatus operates as follows. Oily confectionery raw material is introduced into the spray apparatus through the oily confectionery raw material inlet 8. At this time, the needle 9 is moved by compressed air that is introduced through the compressed air inlet 7, and the oily confectionery raw material is discharged through the nozzle 13. In order to spray fine particles of oily confectionery raw material, compressed air is introduced into the apparatus through the spray air inlet 12 and discharged through the spray air outlet 10. That is, the cap-bar drive motor 5 is driven to operate the slipping clutch 4, and then, the nozzle cap 1 is only linearly moved via the nozzle cap driving bar 2 in the lengthwise direction without an axial rotation or screwing thereof. As a result, as shown in FIG. 2, a gap is formed between the nozzle cap 1 and the nozzle 13. The compressed air passes through the spray air outlet 10 and the gap, and is discharged to the outside of the nozzle 13. Consequently, the oily confectionery raw material discharged from the nozzle 13 is sprayed in the form of fine particles.

The only linear movement distance of the nozzle cap 1 is increased to expand the spraying area of the oily confectionery raw material. The position of the nozzle-cap-bar drive disc 3 is detected by the nozzle-cap drive control sensor 6 to measure the only linear movement distance of the nozzle cap 1. The nozzle cap movement distance is set on the basis of the measured distance. In this way, the gap between the nozzle cap 1 and the nozzle 13 is controlled to achieve a desired spraying area. A spraying area and a particle size of the sprayed oily confectionery raw material may be controlled by use of the set one. Thus, the spray apparatus controls the spray area while maintaining the particle size of the sprayed oily confectionery raw material at a fixed value.

The particle size of the sprayed oily confectionery raw material increases as the diameter of the nozzle 13 increases. The diameter of the nozzle may be set at a desired value by using the nozzle so manufactured.

In practice, the spray apparatus is usually fixed while being vertically directed with its nozzle facing downward. It may, however, be installed in any direction of 360° in use. The direction of the spray apparatus, when it is installed, is selected depending on a viscosity of oily confectionery raw material used and a particle diameter of the sprayed oily confectionery raw material.

When the spraying work is continued for a long time, fine particles of the sprayed oily confectionery raw material inevitably attach to the nozzle 13 and the nozzle cap 1. When cooled, the attached particles are hardened, and therefore cause subsequent spraying to be non-uniform. To avoid this condition, the cap heater 11 is provided in the spray apparatus.

The spray apparatus of the invention is well adapted to spray oily confectionery raw materials, such as chocolate, white chocolate, oily cream, and the like.

EXAMPLES

By way of illustration only (an not as a limitation of the present invention), the following examples are provided.

Example 1

Chocolate materials consisting of 25 parts by weight of cacao mass, 20 parts by weight of cacao butter, 20 parts by weight of powdered milk, 35 parts by weight of sugar, 0.5 part by weight of lecithin, and 0.1 parts by weight of vanillin were agitated and mixed. The mixture was processed in a known manner. Namely, the mixture was subjected to a refiner process and a conching process, and chocolate material was prepared.

The spray apparatus as shown in FIGS. 1 and 2 was used. The diameter of the nozzle 13 was 5 mm. The chocolate material was temperature controlled and set at 32° C., and supplied under a pressure of 2 $Kg/cm^2$ into the raw material inlet 8. Compressed air was supplied under a pressure of 2 $Kg/cm^2$ through the spray air inlet 12. The temperature of the cap heater 11 was set at 33° C. The nozzle-cap drive control sensor 6 was set so as to locate the nozzle cap 1 at a position distance 2 mm in front of the nozzle 13. That is, the distance of 2 mm was measured by the nozzle-cap drive control sensor 6. Compressed air was introduced under a pressure of 2 $Kg/cm^2$ into the compressed air inlet 7, thereby moving the needle 9 to a position located behind the nozzle 13 and spraying the chocolate material through the discharge orifice of the nozzle 13. The chocolate material was sprayed to a plane located vertically under the discharge orifice and at a position distanced 700 mm from the same.

The spray apparatus sprayed the chocolate material uniformly over a circle area of 500 mm in diameter on the plane. The diameter of the chocolate particles was in the range from 1.0 mm to 1.5 mm.

Example 2

Example 2 used the chocolate material that was prepared in the same manner as in example 1, and introduced into the apparatus under the same conditions as in the example 1. However, the nozzle cap 1 was only linearly moved to and set at a position distanced 1 mm in front of the nozzle 13 on the basis of the result of the measurement by the nozzle-cap drive control sensor 6. Compressed air was introduced under a pressure of 2 $Kg/cm^2$ into the compressed air inlet 7, thereby moving the needle 9 to a position located behind the nozzle 13 and spraying the chocolate material through the discharge orifice of the nozzle 13. The chocolate material was sprayed toward a plane located right under the discharge orifice and at a position distanced 700 mm for the same.

The spray apparatus sprayed the chocolate material uniformly over a circle area of 300 mm in diameter on the plane. The diameter of the chocolate particles was in the range from 1.0 mm to 1.5 mm.

As described above, the present invention provides a spray apparatus that independently controls a spraying area and a particle size of the sprayed oily confectionery material in a simple and automatic manner.

What is claimed is:

1. A spray apparatus, comprising:
   a nozzle for spraying a material therethrough in a spray direction;
   a nozzle cap having an exit aperture, said nozzle cap disposed around said nozzle for only linear movement between (1) a retracted position in which said nozzle cap abuts against said nozzle, and (2) an extended position in which said nozzle cap is spaced apart from said nozzle to define a gap therebetween; and
   an air inlet for receiving air from an external source, wherein said gap accommodates a discharge of the air around said nozzle to achieve a desired spraying area, wherein, when said nozzle cap is in said extended position, said exit aperture of said nozzle cap is positioned downstream from said nozzle relative to said spray direction, such that a spray of said material first exits said nozzle and then passes through said exit aperture of said nozzle cap.

2. A spray apparatus according to claim 1, further including:
   a nozzle cap driving bar coupled to said nozzle cap;
   a nozzle-cap-bar drive disc coupled to said nozzle cap driving bar; and
   a cap-bar drive motor coupled to said nozzle-cap-bar drive disc for imparting linear movement to said nozzle-cap-bar drive disc and moving said nozzle cap to said retracted and said extended positions.

3. A spray apparatus according to claim 2, further including a nozzle-cap drive control sensor coupled to said motor, for controlling said linear movement of said nozzle-cap-bar drive disc to achieve a desired spraying area.

4. A spray apparatus according to claim 1, further comprising a cap heater provided on said nozzle.

5. A spray apparatus according to claim 4, wherein said cap heater is for heating said nozzle to a temperature which is higher than that of said material to be sprayed therethrough.

6. A spray apparatus, comprising:
   a nozzle for spraying a material therethrough;
   a nozzle cap disposed around said nozzle for only linear movement between (1) a retracted position in which said nozzle cap abuts against said nozzle, and (2) an extended position in which said nozzle cap is spaced apart from said nozzle to define a gap therebetween;
   a nozzle cap driving bar coupled to said nozzle cap;

a nozzle-cap-bar drive disc coupled to said nozzle cap driving bar; and a cap-bar drive motor coupled to said nozzle-cap-bar drive disc for imparting linear movement to said nozzle-cap-bar drive disc and moving said nozzle cap to said retracted and said extended positions.

7. A spray apparatus according to claim 6, further including a nozzle-cap drive control sensor coupled to said motor, for controlling said linear movement of said nozzle-cap-bar drive disc to achieve a desired spraying area.

* * * * *